US012728952B2

(12) United States Patent
Nicolai

(10) Patent No.: US 12,728,952 B2
(45) Date of Patent: Sep. 8, 2026

(54) BOTTOM BRACKET GEARSHIFT FOR AN ELECTRIC BICYCLE AND ELECTRIC BICYCLE WITH SUCH A BOTTOM BRACKET GEARSHIFT

(71) Applicant: Karlheinz Nicolai, Lübbrechtsen (DE)

(72) Inventor: Karlheinz Nicolai, Lübbrechtsen (DE)

( * ) Notice: Subject to any disclaimer, the term of this patent is extended or adjusted under 35 U.S.C. 154(b) by 492 days.

(21) Appl. No.: 17/578,904

(22) Filed: Jan. 19, 2022

(65) Prior Publication Data

US 2022/0234683 A1 Jul. 28, 2022

(30) Foreign Application Priority Data

Jan. 22, 2021 (DE) .................... 10 2021 101 415.8

(51) Int. Cl.
*B62M 25/02* (2006.01)
*B62M 6/45* (2010.01)
*B62M 11/06* (2006.01)

(52) U.S. Cl.
CPC .............. *B62M 25/02* (2013.01); *B62M 6/45* (2013.01); *B62M 11/06* (2013.01)

(58) Field of Classification Search
CPC ........ B62M 25/02; B62M 6/45; B62M 11/06; B62M 6/55; F16H 3/091; F16H 3/10
See application file for complete search history.

(56) References Cited

U.S. PATENT DOCUMENTS 5,845,727 A * 12/1998 Miyazawa ............... B62M 6/55 464/57
7,644,944 B2 * 1/2010 Nicolai .................. B62M 11/06 280/238
9,228,652 B2 * 1/2016 Nishikawa ............... B62M 1/36
9,758,213 B2 * 9/2017 Kawakami ............... B62M 9/12
10,167,047 B2 * 1/2019 Nishikawa ............... B62M 6/45

FOREIGN PATENT DOCUMENTS

CN 106627971 A 5/2017
DE 2619500 A1 8/1977
DE 10257973 B3 7/2004
DE 102004045364 B4 3/2006
DE 10 2012 209 096 A1 12/2013
DE 10 2012 023 150 A1 5/2014
(Continued)

OTHER PUBLICATIONS

Search Report for European Patent Application No. 21205163.5-1009 with English translation, dated Mar. 31, 2022, 16 pages.
(Continued)

*Primary Examiner* — Victor L Macarthur
(74) *Attorney, Agent, or Firm* — Edell, Shapiro & Finnan LLC

(57) ABSTRACT

Presented herein is a bottom bracket gearshift (1) of an electric bicycle (64) with an auxiliary drive (22), in particular in the form of a central motor. The bottom bracket gearshift (1) has a shift gearbox (4). In order to make the shift gearbox as small and light as possible, an input stage (14) is arranged at the transmission input (10) of the shift gearbox (4). The input stage (14) may be arranged between a bottom bracket shaft (6) and/or the auxiliary drive (22) and is configured as a transmission into high-speed.

19 Claims, 7 Drawing Sheets

(56) References Cited

FOREIGN PATENT DOCUMENTS

| | | | |
|---|---|---|---|
| DE | 20 2014 101 700 | U1 | 6/2014 |
| DE | 10 2013 206 710 | A1 | 10/2014 |
| DE | 10 2013 113 524 | A1 | 6/2015 |
| DE | 10 2014 106 591 | A1 | 11/2015 |
| EP | 2924319 | A1 | 9/2015 |
| EP | 3599152 | A1 | 1/2020 |
| WO | 2011090958 | A1 | 7/2011 |

OTHER PUBLICATIONS

Search Report for European Patent 3599152 dated Nov. 20, 2019, 2 pages.
German Search Report for German Patent No. 10 2021 101 415.8 dated Oct. 6, 2021, 10 pages.
Office Action from the European Patent Office for European Patent Application No. 21205163.5, dated Nov. 23, 2023, 11 pages (including 4 pages of an English language translation of the Office Action).
Office Action from the European Patent Office for European Patent Application No. 21205163.5, dated Apr. 3, 2023, 14 pages (including 5 pages of an English language translation of the Office Action).
Office Action for European Patent Application No. 21205163.5 from the European Patent Office dated Jan. 21, 2025 with English translation, 10 pages.

* cited by examiner

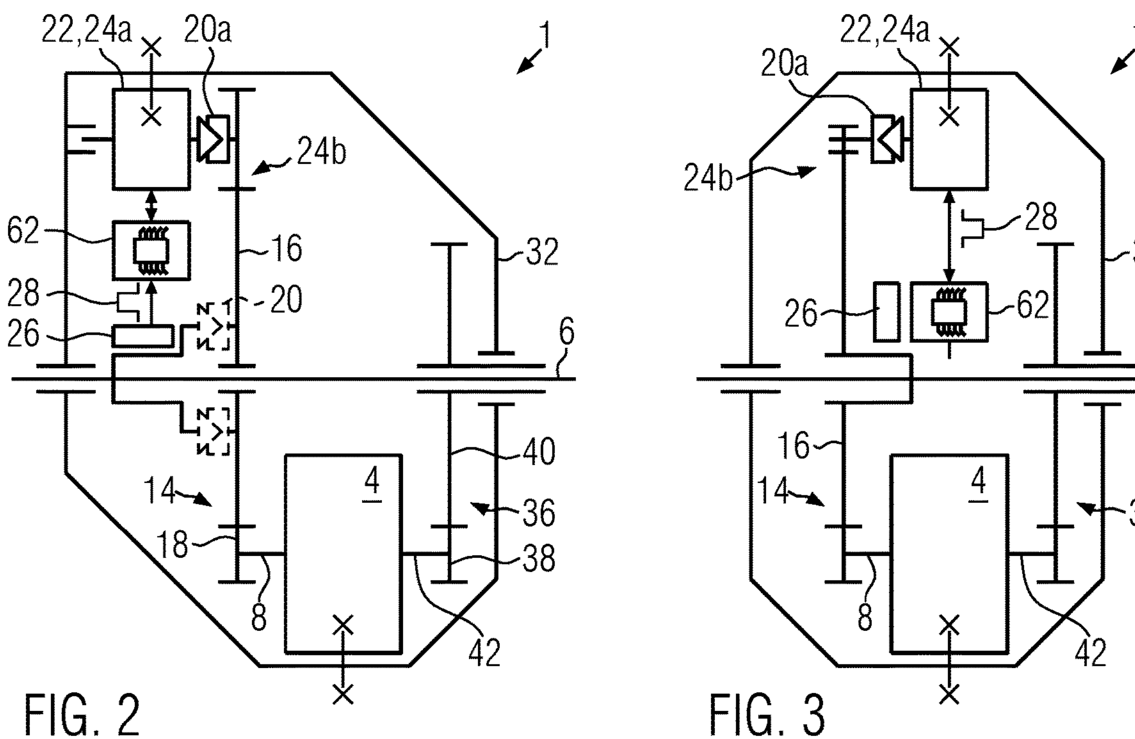
FIG. 2
FIG. 3
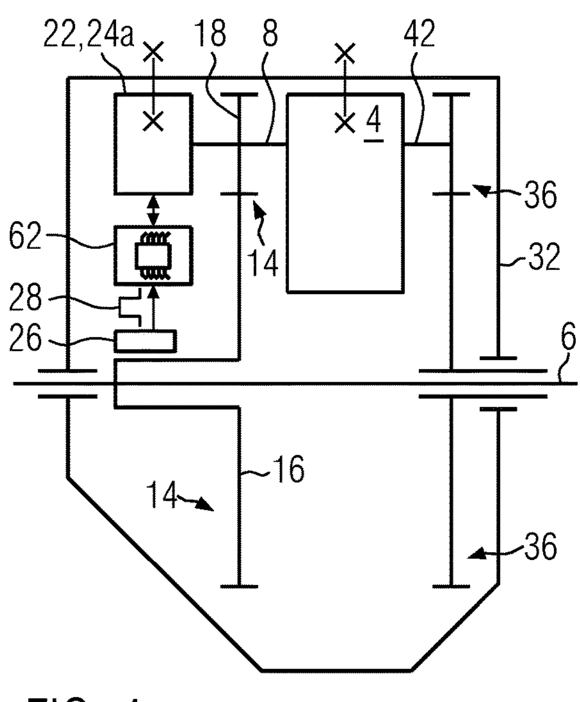
FIG. 4

BOTTOM BRACKET GEARSHIFT FOR AN ELECTRIC BICYCLE AND ELECTRIC BICYCLE WITH SUCH A BOTTOM BRACKET GEARSHIFT

The present disclosure relates to a bottom bracket gearshift of an electric bicycle and to an electric bicycle with such a bottom bracket gearshift.

Electric bicycles have an auxiliary drive that assists the pedaling motion of a cyclist. A gearshift on the electric bicycle ensures that pedaling can be carried out over a wide speed range at a roughly constant cadence.

The auxiliary drive is located at the bottom bracket of the electric bicycles considered here. In this configuration, derailleur gears or hub gears are usually used, since there is not enough space available at the bottom bracket. However, derailleur gears are disadvantageous in that the components of the gearshifting system, namely the sprockets on the rear hub, the at least one chainring and the chain together with the derailleur, are unprotected and therefore easily contaminated. A derailleur gear is therefore comparatively high-maintenance component.

Hub gears are used instead of or together with derailleur gears on the rear wheel. The hub gears are encapsulated from the external environment in a housing and are therefore largely maintenance-free. A disadvantage of hub gears, however, is the high weight on the rear wheel, which leads to an unfavorable weight distribution. The high weight at the rear hub is not only annoying when carrying the bike, but also when cornering or driving off-road in a sporty manner.

A much more advantageous weight distribution is obtained when the gearshift is positioned centrally in the bicycle, as is the case with bottom bracket gearshifts, for example. However, bottom bracket gearshifts are quite large, leaving no space around the bottom bracket for the electric motor. In addition, bottom bracket gearshifts are already so heavy on their own that the additional weight of an auxiliary drive would result in an electric bicycle that would be too heavy for everyday use or for continuing to ride when the battery is empty.

Thus, there is a need for a bottom bracket gearshift of an electric bicycle that has a sufficiently small installation space so as to be combined with an auxiliary drive on the bottom bracket and that has only a low weight.

The present disclosure solves this problem. It provides a bottom bracket gearshift for an electric bicycle with auxiliary drive, in particular in the form of a central motor, in that the bottom bracket gearshift has a bottom bracket shaft, a shift gearbox and, at the transmission input of the shift gearbox, an input stage, the input stage being arranged between the bottom bracket shaft and the gearbox and being configured as a transmission into high-speed. The term "between" here refers to the power flow through the bottom bracket gearshift.

The input stage designed as a transmission reduces the torque to be transmitted in the shift gearbox because the shift gearbox rotates faster. A lower torque needs therefore to be transmitted for the same power. The reduced torque allows the design of the gears to be smaller and lighter. Surprisingly, the weight advantage resulting from the lighter gears of the shift gearbox is greater than the additional weight of the input stage.

The present disclosure may be further improved with the further embodiments described below. The individual embodiments are advantageous independently of one another and may be combined with one another as desired.

For example, in order to make the gearbox particularly small and light while concurrently preventing the angular momentum of the gears in the gearbox from becoming too great, it is advantageous if the transmission ratio of the input stage is between 3:1 and 5:1. With a transmission ratio in this range, the input stage remains quite compact.

According to a further advantageous embodiment, the input stage may have an input gear on the driven side on a gear shaft of the shift gearbox, in particular the input shaft of the shift gearbox, and an input gear on the drive side seated indirectly or directly on the bottom bracket shaft. This leads to a structurally simple design.

Preferably, the input gear on the drive side and on the driven side mesh directly with one another, but one or more further input gears may also be present between the input gear on the drive side and on the driven side in a meshing manner.

It is also advantageous if a freewheel is arranged between the input stage and the bottom bracket shaft. The freewheel prevents the electric motor from driving the legs of the cyclist. The freewheel separates the bottom bracket shaft from the input gear on the drive side when the speed of the input gear on the drive side is greater than the speed of the bottom bracket shaft. This is the case, for example, when the user of the bicycle suddenly stops pedaling. As soon as the speed of the bottom bracket shaft has risen again to the speed of the input gear on the drive side, the freewheel engages automatically and the pedaling energy of the cyclist is fed into the input stage.

Between the freewheel and the first input gear a speed and/or rotational speed sensor, and/or a torque sensor, may be arranged, the signal from which may be used to control the auxiliary drive.

In a further advantageous embodiment the input gear on the drive side is mounted on a hollow shaft (on the input side), in which the bottom bracket shaft is received. Preferably, the hollow shaft is mounted on the bottom bracket shaft.

Preferably, the input-side hollow shaft and the bottom bracket shaft are coaxial with each other. The use of a hollow shaft on the input side allows greater freedom in terms of design. For example, it is easier to attach the freewheel and/or the speed sensor and/or torque sensor to the hollow shaft. When using the hollow shaft, the input gear on the drive side sits indirectly on the bottom bracket shaft.

The input gear on the drive side may, however, also be arranged directly on the bottom bracket shaft. In this case, a freewheel may be dispensed with, or the freewheel is integrated into the input gear. It is also possible for the freewheel to be located at a different position between the bottom bracket shaft and the auxiliary drive. Dispensing with the hollow shaft on the input side with respect to the gearbox results in greater weight savings.

The input stage, in particular the input gear on the drive side, is preferably designed to be driven both by the bottom bracket shaft and by the auxiliary drive. In particular, the drive-side input gear may be in engagement with the auxiliary drive or a reduction gear of the auxiliary drive. In addition, the input gear on the drive side is connected to the bottom bracket shaft, possibly with the interposition of a freewheel. Thus, the power flows from the pedals and from the auxiliary drive are combined at the input stage, in particular at the input gear on the drive side.

The auxiliary drive has an auxiliary motor, preferably an electric motor. The auxiliary drive may further comprise a reduction gear. The reduction gear is often designed as a structural unit mechanically matching the auxiliary motor or its housing. The auxiliary motor and reduction gear may be commercially available products. Advantageous, but not mandatory, is a second freewheel, which is arranged in front of or in the reduction gear of the auxiliary drive. This freewheel ensures that the cyclist does not operate the electric auxiliary drive as a generator during heavy pedaling.

In order to couple the auxiliary drive to the input stage, the bottom bracket shift, in particular a housing of the bottom bracket shift, may have a mechanical interface for attaching the auxiliary drive to the bottom bracket shift. Such an interface may be a flange, for example. Depending on the auxiliary drive and/or manufacturer, the mechanical interfaces may have various configurations.

The output of the bottom bracket shift, at which the pedaling power of the cyclist, possibly combined with the drive power of the auxiliary drive, may be tapped to drive the rear wheel of the electric motor, is preferably arranged coaxially with the bottom bracket shaft.

An output stage with a driven-side output gear may be provided at the transmission output of the shift gearbox. The driven-side output gear is preferably seated on an output-side hollow shaft and is in particular connected to the latter in a torsionally rigid manner. The output-side hollow shaft preferably accommodates the bottom bracket shaft, in particular this output-side hollow shaft is mounted in the housing and with respect to the bottom bracket shaft. The output-side hollow shaft and the bottom bracket shaft preferably run coaxially.

The hollow shaft on the output side is preferably guided to the outside of the bottom bracket gearshift and is designed to accommodate a drive device such as a chainring or a pulley. The drive device drives the rear wheel in the electric bicycle via a traction device, for example a chain or a toothed belt. The output-side hollow shaft thus forms the output of the bottom bracket gearshift.

A drive-side output gear of the output stage is in mesh with the driven-side output gear. The drive-side output gear may be seated on the output shaft of the shift gearbox. Advantageously, the drive-side output gear and the driven-side output gear mesh directly with each other, although alternatively at least one further output gear may be disposed in meshing relationship between the drive-side output gear and the driven-side output gear. For weight reasons, however, it is preferred that only two output gears are present in the output stage.

To save space, the input-side hollow shaft and the output-side hollow shaft may be arranged next to each other in the axial direction of the bottom bracket shaft.

In another variant, the auxiliary drive does not drive the input stage but the output stage, in particular the driven-side output gear of the output stage directly. This arrangement has the advantage that the power of the motor may be made available at the output with fewer losses. The auxiliary drive or its reduction gear is in direct engagement with the driven-side output gear. In this embodiment, between the output gear on the drive side and the auxiliary drive a freewheel may be arranged, the function of which corresponds to that of the freewheel described above in connection with the input stage. A freewheel at the input stage and a hollow shaft on the input side may be dispensed with in this embodiment, so that it enables the construction of a particularly lightweight bottom bracket gearshift. In this embodiment, however, it is preferable to use an auxiliary drive that provides a high drive torque even at low speed.

The output stage is preferably designed as a reduction gear, so that high torques may be tapped at the hollow shaft on the output side. The reduction ratio of the output stage may be between 1:2 and 1:4.

The product of the reduction ratio of the output stage and the transmission ratio of the input stage is advantageously between 0.7 and 1.5. Preferably, however, the product is greater than 1. In this embodiment, the entire bottom bracket gearshift is thus designed as a transmission of the rotational movement of the bottom bracket shaft into the high-speed range and permits the use of chainrings or toothed belt pulleys of approximately the same size on the bottom bracket and rear wheel hub in the case of conventional gear steps of the shift gearbox.

The bottom bracket gearshift may have a housing, in which at least the bottom bracket shaft and the input gear on the drive side and the output gear on the driven side are accommodated with the shafts carrying them. Preferably, the auxiliary drive, possibly with reduction gear, and/or the gearbox may also be accommodated or are accommodated in the housing of the bottom bracket gearshift. In the fully assembled state, the bottom bracket shaft, the gearbox, the auxiliary drive and the input and output stages are preferably structurally combined, in particular within the housing. In this way, the bottom bracket gearshift may be pre-assembled or pre-assembled with the auxiliary drive and gearbox and is designed to be handled as a single piece.

The housing of the bottom bracket gearshift is preferably designed as a structural component of a frame of the electric bicycle in order to stiffen the frame in the area of the bottom bracket and to reduce weight.

The auxiliary drive, optionally with reduction gear, may be part of the bottom bracket gearshift. If an auxiliary drive is provided, it preferably drives the input or output stage directly.

The gearbox has at least one input shaft and one output shaft. Furthermore, at least one further gear shaft, for example in the form of an intermediate shaft, may be provided. The shift gearbox has two or more shift stages, which may be provided with freewheels and shifting clutches for shifting different gears, for example, with the aid of a shift element mounted on a handlebar of the electric bicycle. The shift gearbox is preferably arranged offset from the bottom bracket shaft. The gearbox should have at least four, preferably at least nine, gears. The gear shafts preferably run parallel to the bottom bracket shaft.

In order to save space, the gearbox and/or the auxiliary drive may be arranged at least partially between the input stage and the output stage in the axial direction of the bottom bracket shaft. For this purpose, the input shaft and the output shaft may project from the gearbox on opposite sides of the gearbox or be arranged so as to be accessible from outside the gearbox. The input shaft and the output shaft may also project from the same side of the shift gearbox.

The shift gearbox and auxiliary drive may also be arranged at least partially overlapping next to each other in the axial direction of the bottom bracket shaft.

According to a further embodiment, the bottom bracket gearshift has at least four shafts arranged axially parallel to one another, including for example the bottom bracket shaft, the input shaft, the output shaft and/or a further gear shaft of the shift gearbox, which are mounted indirectly or directly in the housing of the bottom bracket gearshift.

The housing of the bottom bracket shift may have at least two housing parts that are joined together and/or may be joined together. This simplifies maintenance and repair of the bottom bracket gearshift, since access to the interior of the housing is possible by removing one housing part, which is configured, for example, as a cover or cap.

At least two shafts, in particular the bottom bracket shaft and the output shaft or a hollow shaft, may project from the housing to the outside on at least one side.

According to a further embodiment, at least one shaft of the bottom bracket gearshift projects from the housing to the outside on two sides. This shaft may in particular be the bottom bracket shaft.

At least one shaft of the bottom bracket gearshift, for example the bottom bracket shaft, the input shaft, the output shaft and/or at least one further gear shaft of the gearbox may be arranged coaxially with the stator and rotor of an electric motor.

In a further embodiment, the bottom bracket gearshift may have at least two or at least three shafts, each of which carrying at least two gears. These three shafts may be, for example, the input shaft, the output shaft and at least one further gear shaft of the shift gearbox. However, at least two gears may also be arranged on the bottom bracket shaft.

In order to provide a sufficient number of shift stages, at least three gears may be connected to at least one shaft of the bottom bracket gearshift, such as the bottom bracket shaft, the output shaft, the input shaft or at least one further gear shaft of the manual gearbox, via a respective shifting clutch and/or at least one freewheel.

In order to provide a signal for controlling the auxiliary drive, a speed or rotational speed sensor and/or a torque sensor may be located on at least one shaft or at least one gear of the bottom bracket gearshift. When the electric bicycle is ready for operation, the speed or rotational speed sensor and/or the torque sensor is connected in a signal-transmitting manner to a controller of the auxiliary drive.

According to a further embodiment, the bottom bracket gearshift has at least one shaft, on which all the gears are completely connected to the shaft in a rotationally fixed manner. In particular, this shaft may be at least one further gear shaft of the shift gearbox, which runs parallel to the input shaft and/or output shaft. In the power flow directed from a transmission input to a transmission output, the shaft with the non-rotatably connected gears may be arranged in particular between the input shaft and the output shaft.

For weight distribution, it is advantageous if at least two of the shafts of the gearbox, i.e., at least two shafts from the group including the input shaft, the output shaft and at least one further gear shaft, are located in front of the bottom bracket shaft in the direction of travel when the bottom bracket gearshift is installed in the electric bicycle.

Finally, one or more shafts of the bottom bracket gearshift may also be designed as a hollow shaft and arranged coaxially with one or more other shafts of the bottom bracket shift.

In the following, which is explained by way of example with reference to the accompanying drawings. In accordance with the above embodiments, individual features may be omitted should the technical effect of a feature not be important in a particular application. Conversely, a feature not described or illustrated in an exemplary embodiment may be added if the technical effect of that feature in a particular application should be important.

In the drawings, the same reference signs are used for elements that correspond to each other in terms of structure and/or function.

In the Figures:

FIG. 2 is a schematic representation of a bottom bracket gearshift of an electric bicycle in a further embodiment;

FIG. 3 is a schematic representation of a bottom bracket shift of an electric bicycle in a further embodiment;

FIG. 4 is a schematic representation of a bottom bracket gearshift of an electric bicycle in a further embodiment;

First, the structure of a possible embodiment of a bottom bracket gearshift 1 is explained with reference to FIG. 1. The bottom bracket gearshift 1 is designed to be mounted in the region of a bottom bracket of a frame of an electric bicycle with a central motor (neither shown in FIG. 1). A power flow through the bottom bracket gearshift 1 is indicated by the double arrow 2.

Figure 1:
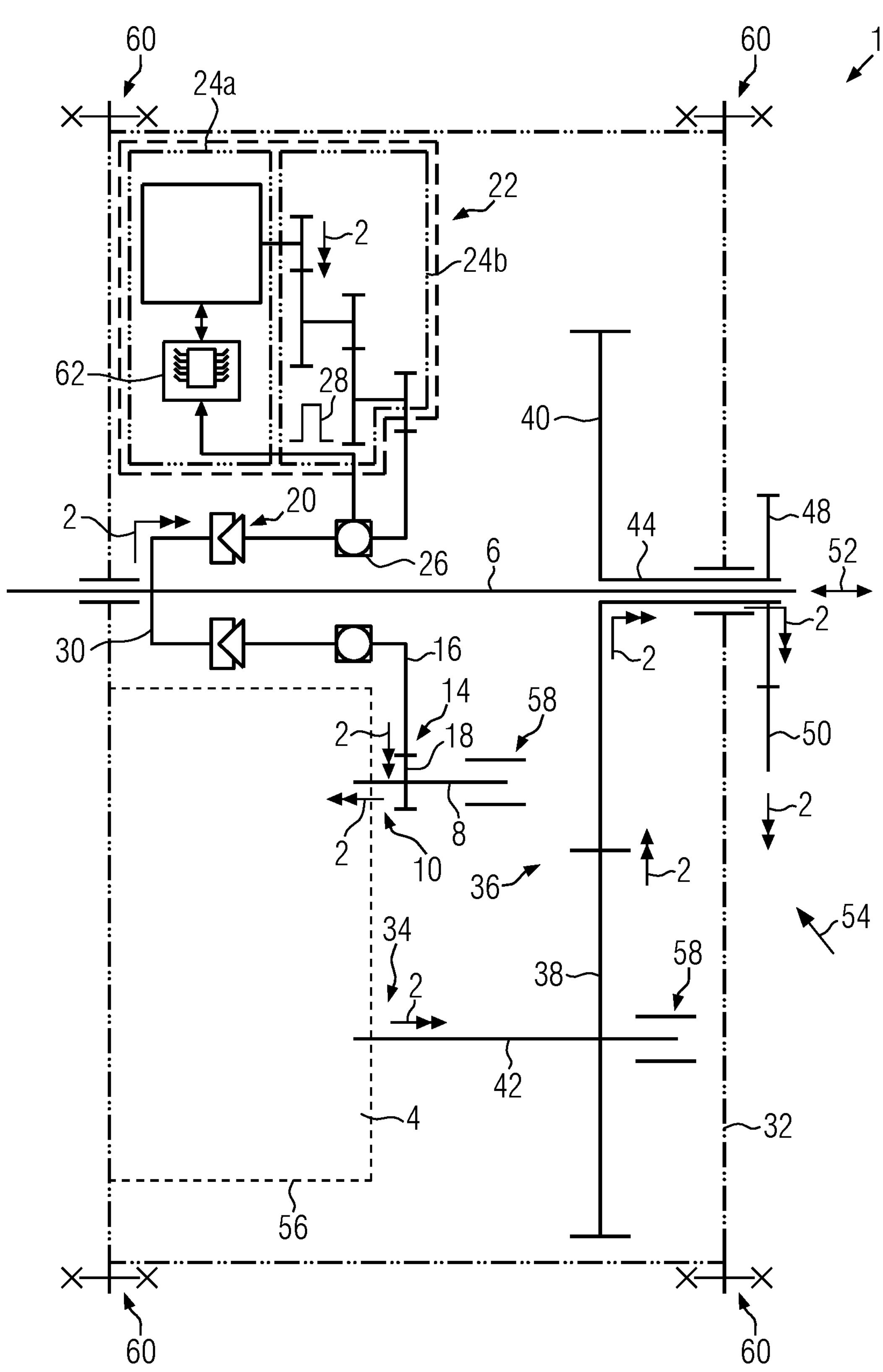
FIG. 1 is a schematic representation of a bottom bracket gearshift of an electric bicycle in a first embodiment.

The bottom bracket gearshift 1 has a shift gearbox 4, which is only indicated in FIG. 1. The shift gearbox 4 has an input shaft 8 offset radially and parallel to a bottom bracket shaft 6.

An input stage 14 is located upstream of a transmission input 10 of the shift gearbox 4. The input stage 14 is a transmission into high speed with a transmission ratio between about 3:1 and about 5:1. It has two meshing input gears 16, 18, in particular in the form of spur-cut gears. One driven-side input gear 18 is seated on an input shaft 8 of the manual shift gearbox 4; the other input gear 16 is seated indirectly or directly on the bottom bracket shaft 6.

A freewheel 20 is optionally arranged between the input stage 14 and the bottom bracket shaft 6. The freewheel 20 connects the bottom bracket shaft 6 and the input stage 14 in a rotationally rigid manner when the rotational speed of the bottom bracket shaft 6 is at least as great as the rotational speed of the input gear 16 on the drive side. If the rotational speed of the bottom bracket shaft 6 is less than the rotational speed of the input gear 16 on the drive side or is backward, the freewheel 20 automatically disengages and the input gear 16 on the drive side is allowed to rotate independently of the bottom bracket shaft 6.

The input stage 14, in particular its drive-side input gear 16, is driven not only by the bottom bracket shaft 6, but also by an auxiliary drive 22. For this purpose, the auxiliary drive 22 is preferably directly in engagement with the input stage 14, in particular the input gear 16 on the drive side. The auxiliary drive 22 has an auxiliary motor **24*a* and optionally a reduction gear 24*b*. The reduction gear 24*b* of the auxiliary drive 22 may be designed as a structural unit that may be attached separately from the auxiliary motor 24*a* of the bottom bracket gearshift 1, or may be combined or preassembled together with the auxiliary motor 24*a*** to form a structural unit.

At the input stage 14, in particular the input gear 16 on the drive side, the power flow 2 generated at the bottom bracket shaft 6, which originates from the pedaling movement of a cyclist, and the power flow 2 from the auxiliary drive 22 are combined and directed to the shift gearbox 4. The freewheel 20 prevents power from flowing from the auxiliary drive 22 to the bottom bracket shaft 6; it prevents the auxiliary drive 22 from driving the pedal arms and thus the legs of the cyclist.

A torque and/or speed sensor 26 may be disposed between the drive-side input gear 16 and the bottom bracket shaft 6, particularly between the freewheel 20 and the drive-side input gear 16, and may output a signal 28 usable for controlling the auxiliary drive 22, the signal being representative of a torque and/or speed applied to the drive-side input gear 16 or the bottom bracket shaft 6. The torque and speed sensor 26 may be located upstream or downstream of the freewheel 20 with respect to the power flow.

The drive side input gear 16 may be indirectly arranged on the bottom bracket shaft 6, for example by being disposed on a hollow shaft 30, referred to herein as the input-side hollow shaft, which is disposed coaxially with the bottom bracket shaft 6. The hollow shaft 30 may be connected to the bottom bracket shaft 6 via the freewheel 20. The freewheel 20 and the speed and/or torque sensor 26, if present, are preferably arranged on the hollow shaft. The hollow shaft 30 may be rotatably mounted on the bottom bracket shaft 6 and/or in a housing 32 of the bottom bracket gearshift 1.

Alternatively, the input gear 16 on the drive side may be mounted directly on the bottom bracket shaft 6 in a rotationally rigid manner. In this case, the freewheel 20 may be located in or on the drive-side input gear 16 so that a hollow shaft is unnecessary.

An output stage 36 is located at a transmission output 34 of the shift gearbox 4. The output stage 36 has a drive-side output gear 38 and a driven-side output gear 40, which may be configured as a pair of intermeshing spur gears. The output stage 36 is configured as a reduction gear, the reduction ratio being between 1:2 and 1:4.

The output gear 38 on the drive side is preferably seated on an output shaft 42 of the shift gearbox 4. The output shaft 42 may be radially offset or may be coaxial with the input shaft 8. The input shaft and output shaft of the manual gearbox may be configured to be accessible from the outside on opposite sides of the manual gearbox 4. Alternatively, the input shaft 8 may be a hollow shaft, in which the output shaft 42 is provided, or the output shaft 42 is designed as a hollow shaft, in which the input shaft is provided. The power flow 2 from the shift gearbox 4 is guided via the output shaft 42.

The driven-side output gear 40 is arranged on an output-side hollow shaft 44 of the bottom bracket gearshift 1, which is arranged coaxially with the bottom bracket shaft 6. The output-side hollow shaft 44 may be mounted on the bottom bracket shaft 6 and/or in the housing 32.

At the output-side hollow shaft 44, the power flow 2 may be tapped from outside the bottom bracket and used to drive the electric bicycle. For this purpose, the output-side hollow shaft 44 may be configured to carry a drive gear 48, such as a chainring or a toothed belt wheel. A rear wheel (not shown in FIG. 1) of the electric bicycle may then be driven via the drive gear 48 and a traction device 50, such as a chain or a toothed belt.

The hollow shaft 30 on the input side, if present, and the hollow shaft 44 on the output side are adjacent to each other in the axial direction 52 of the bottom bracket shaft, preferably without overlapping.

The housing 32 of the bottom bracket gearshift 1 is preferably configured as a structural component of a frame of the electric bicycle. As a structural component, the housing 32 absorbs the forces that occur in the frame during operation. Preferably, the housing 32 stiffens the connection between the seat tube and the down tube and, if applicable, the chain stays.

The housing 32 surrounds at least the bottom bracket shaft 6, the input gear 16 on the drive side, and the output gear 40 on the driven side. Both the bottom bracket shaft 6 and the hollow shaft 44 on the output side exit the housing 32 so that they are accessible from outside the housing 32. The output side hollow shaft 44 exits the housing 32 on one side 54 only, while the bottom bracket shaft 6 exits on both sides of the housing 32, with the bottom bracket shaft 6 extending farther out of the housing than the output side hollow shaft 44.

The shift gearbox 4 may have its own housing 56. In this case, the housing 32 of the bottom bracket gearshift 1 and the housing 56 of the shift gearbox 4 are configured to be attached to each other. Preferably, however, the shift gearbox 4 is integrated into the housing 32 or arranged therein without its own housing. In this case, the housing 56 may be omitted. The housing 32 then provides bearing points 58, at which the gear shafts of the shift gearbox 4 are mounted.

The auxiliary drive 22 may be fastened externally or internally to the housing 32. The housing 32 may have corresponding fastening elements, for example flanges, for this purpose. Preferably, however, the auxiliary drive 22, or at least the reduction gear **24*b*, is also integrated in the housing 32 or arranged inside the housing 32**.

For attachment in the vicinity of the bottom bracket of the electric bicycle, the housing 32 is provided with attachment points 60.

FIGS. 2 to 4 show bottom bracket gearshifts 1, in which, in contrast to the embodiment of FIG. 1, the shift gearbox 4 is arranged at least partially between the input stage 14 and the output stage 36 in the direction parallel to the bottom bracket shaft 6. The input shaft 8 and the output shaft 42 are accessible on opposite sides. In terms of function, the bottom bracket gearshifts 1 of FIGS. 1 and 2 are identical. The auxiliary drive 22 is located at a different position in each of the embodiments of FIGS. 2 to 4.

In the embodiment of FIG. 2, the freewheel 20 is optional. The freewheel 20 may be dispensed with if a control unit 62 of the auxiliary drive 22 is programmed and/or configured in an operationally reliable and, if necessary, redundant manner such that the auxiliary drive may never drive the bottom bracket shaft 6 and thus the legs of the bicycle rider.

A further freewheel **20*a* may be arranged between the auxiliary drive 22 and the input stage 14, for example on a drive shaft of the auxiliary drive. The further freewheel 20*a* rotates freely when the input stage 14 overruns the auxiliary drive 22. This prevents the auxiliary drive 22 from being operated as a generator by the cyclist. The freewheel 20*a* may also be dispensed with if a control unit 62 of the auxiliary drive 22** is programmed and/or configured in an operationally reliable and, if necessary, redundant manner such that the auxiliary drive cannot go into generator operation by freely spinning up without a load and in this way cannot take away energy from the cyclist.

As shown in FIG. 2, the auxiliary drive 22 may be spatially disposed, at least section-wise, between the input stage 14 and the housing 32 such that the input stage 14 is spatially disposed between the output stage 36 and the auxiliary drive 22.

As further exemplified in FIG. 2, the input gear 16 on the drive side may be part of a single-stage reduction gear **24*b*. A reduction gear designed as a separate component as in the previous embodiment may thus be dispensed with. The auxiliary drive 22 is thus even more structurally integrated into the bottom bracket gearshift 1**.

As FIG. 3 shows, the auxiliary drive 22 may be arranged spatially, at least section-wise, between the input stage 14 and the output stage 36. In such an arrangement, it is advantageous if the torque and/or speed sensor 26 and/or the freewheel 20 are/is also located between the input stage 14 and the output stage 36.

As shown in FIG. 4 by way of example, the driven-side input gear 18 may be arranged coaxially with the input shaft 8. This makes at least one gear obsolete.

Figure 5:
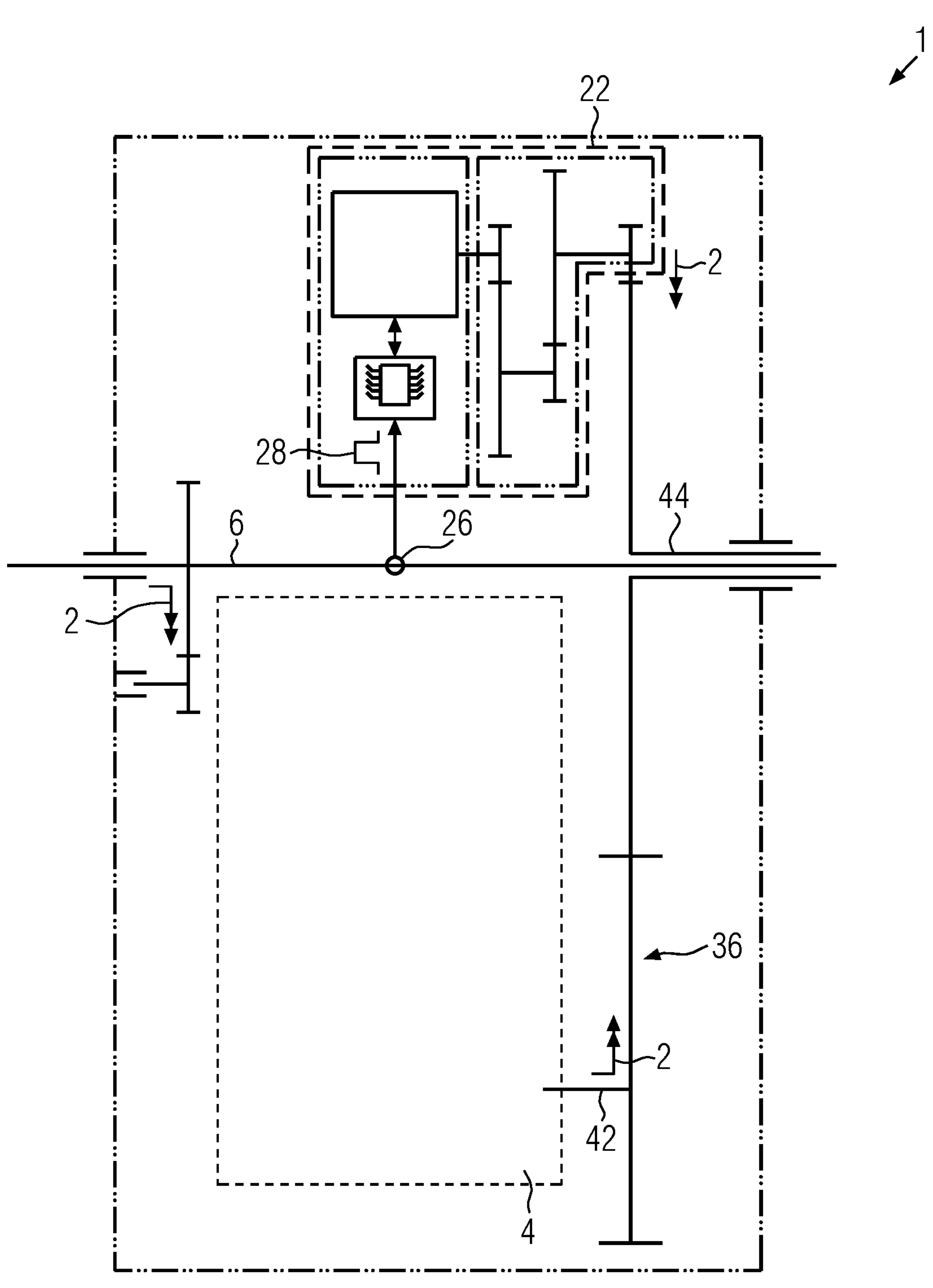
FIG. 5 is a schematic representation of a bottom bracket gearshift of an electric bicycle in a further embodiment.

In the embodiment of FIG. 5, the power flow 2 from the auxiliary drive 22 and the power flow 2 from the bottom bracket shaft 6 are combined at the output stage 36 and not, as in the previous embodiments, at the input stage 14. The freewheel 20 is located between the shift gearbox 4 and the output-side hollow shaft 44, for example, at the output shaft 42 of the shift gearbox 4. The speed and/or torque sensor 26 may be arranged on the bottom bracket shaft 6, as in the embodiment of FIG. 1. In all other respects, the function and structure of the embodiment of FIG. 5 correspond to those of the embodiment of FIG. 1.

Figure 6:
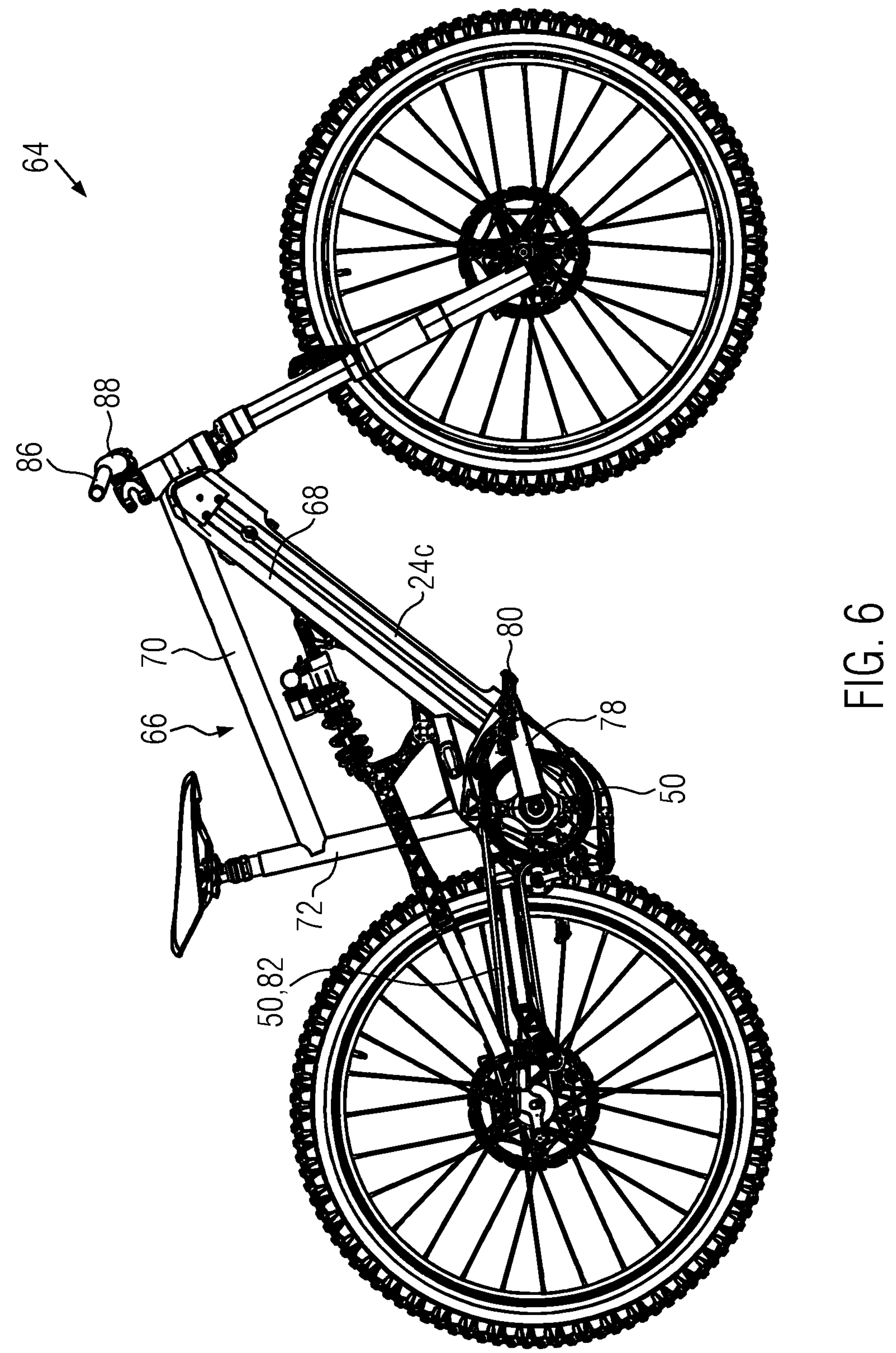
FIG. 6 is a schematic representation of an electric bicycle with a bottom bracket gearshift.

FIG. 6 shows the bottom bracket gearshift 1 on an electric bicycle 64 that is ready for operation here. The electric bicycle 64 has, for example, a diamond-shaped frame 66 with a down tube 68, a top tube 70 and a seat tube 72. A battery 24*c* of the auxiliary drive may be disposed on the down tube 68 or other location of the frame 66. The bottom bracket gearshift 1 forms the bottom bracket 74 and is disposed in the region 76 where the down tube 68 and the seat tube 72 are connected. The housing 32 stiffens the frame 66 in the area 76 and is thus a supporting part of the frame 66.

Attached to the bottom bracket shaft 6 in FIG. 6 are cranks 78 that support pedals 80. On one side 54 of the bottom bracket gearshift 1, spatially between the crank 78 and the housing 32 on the hollow shaft 44 on the output side, a toothed belt pulley is mounted as a drive wheel or drive gear 48. The drive gear 48 drives the rear wheel 84 of the electric bicycle 64 via a toothed belt 82. Of course, a chain drive may be used instead of the toothed belt drive shown.

A shift element 86 on the handlebar 88 of the electric bicycle 64 is used to actuate the shift gearbox 4.

Figure 7:
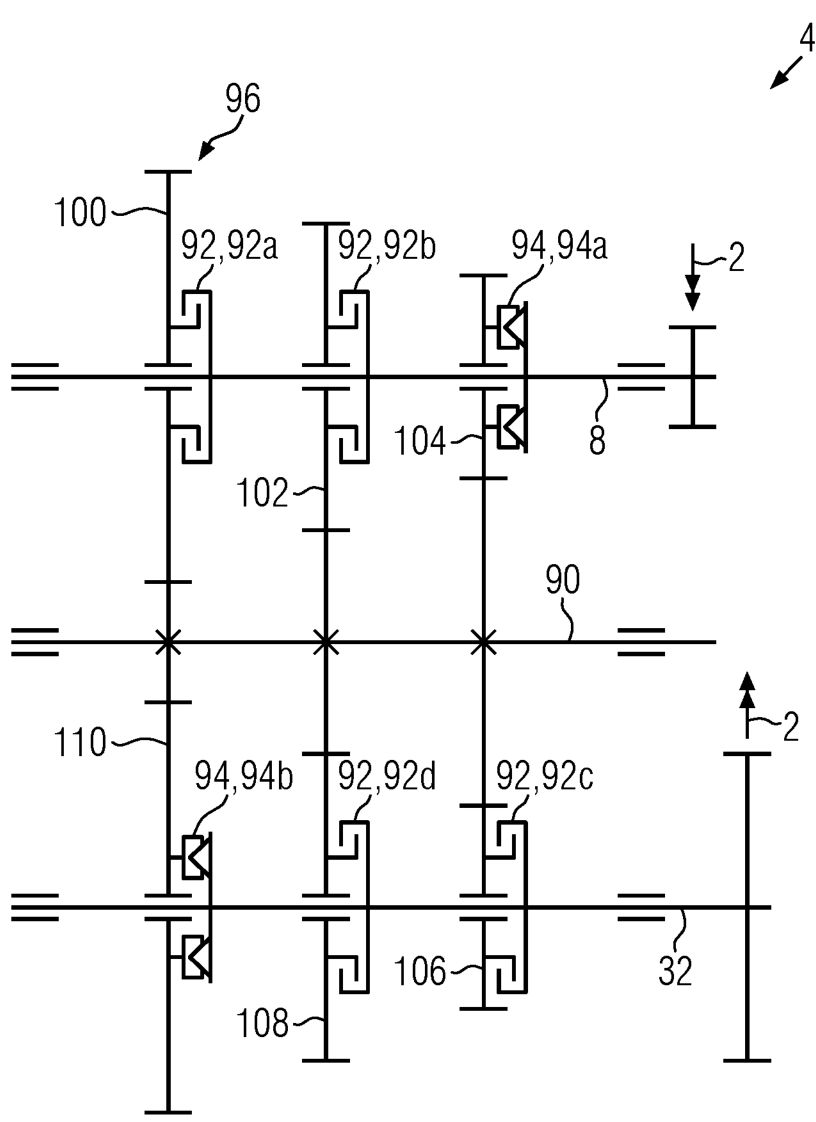
FIG. 7 is a schematic representation of a shift gear of the bottom bracket gearshift.

With reference to FIG. 7, a shift gearbox 4 is briefly described below in terms of structure and function. In principle, a gearbox 4 other than the one shown may be used instead. However, the shift gearbox 4 should have at least two transmission shafts, namely the input shaft 8 and the output shaft 42, both of which are preferably arranged parallel to and spaced apart from the bottom bracket shaft 6.

Preferably, the shift gearbox has at least six, more preferably at least nine gears. The shift gearbox 4 may have at least one further gear shaft 90, which is arranged in particular parallel to the input shaft 8.

Shifting clutches 92 and freewheels 94 may be provided for shifting the individual gears, which may be engaged or disengaged by actuating the shift element 86 (FIG. 5) according to a predetermined pattern. In terms of design and (shift) function, the shift gearbox 4 shown in FIG. 7 corresponds largely to the shift gearbox shown and described in DE 10 2004 045 364 B4, to which full reference is made.

In contrast to the gearbox of DE 10 2004 045 364 B4, however, the bottom bracket shaft 6 of the bottom bracket gearshift 1 is not simultaneously a gear shaft, but the shift gearbox 4 is offset laterally and parallel to the bottom bracket shaft 6. In the configuration of FIG. 7, the input shaft 8 of the shift gearbox 4 is located in place of the bottom bracket shaft of the shift gearbox of DE 10 2004 045 364 B4. The shift gearbox 4 of FIG. 7 also has at least one more shift stage 96 than the shift gearbox of FIG. 18 of DE 10 2004 045 364 B4, so that a total of nine gears may be shifted using the three shift stages 96*a*, 96*b*, 96*c*.

The individual clutches are designated below as 92*a* to 92*d* and the freewheels as 94*a* and 94*b*. The shifting clutch 92*a* is arranged between the largest gear 100 on the input shaft 8 and the input shaft 8, and the shifting clutch 92*b* is arranged between the second largest gear 102 on the input shaft 8 and the input shaft 8. The freewheel 94*a* is disposed between the smallest gear 104 on the input shaft 8 and the input shaft 8.

The clutch 92*c* is disposed between the smallest gear 106 on the output shaft 42 and the output shaft 42, and the clutch 92*d* is disposed between the second largest gear 108 on the output shaft 42 and the output shaft 42. The freewheel 94*b* is disposed between the largest gear 110 on the output shaft 42 and the output shaft 42.

If a clutch 92*a* to 92*d* is engaged, the corresponding gear 100-110 is rotationally rigidly connected to the corresponding shaft 8, 42 in the direction of power flow 2, that is, in the direction from the input shaft 8 to the output shaft 42. Opposite to the direction of load transmission, the gear may rotate freely in relation to the shaft. If a clutch 92*a* to 92*d* is disengaged, the corresponding gear 100-110 may always rotate freely relative to the corresponding shaft 8, 42.

The freewheel 94*a* will spin if the gear 104 rotates at least as fast as the input shaft 8. If the gear 104 attempts to rotate slower than the input shaft 8, the freewheel 94*a* will connect the gear 104 and the input shaft 8 in a rotationally rigid manner. At this point, there is no slippage of the gear that is dangerous to the cyclist, since the freewheel 94*a* always transmits the power flow 2 from the transmission input to the transmission output.

The freewheel 94*b* slips when the output shaft 42 rotates at least as fast as the gear 110, which is always the case when one of the clutches 92*d* or 92*c* is engaged. Otherwise, the output shaft 42 and the gear 110 are rotationally rigidly coupled in the direction of the power flow 2. There is no slippage of the gear at this point, which is dangerous to the cyclist, since the freewheel 94*b* always transmits the torque.

A mechanical or electromechanical shift logic, which is not shown, shifts the clutches 92 in a predetermined sequence in order to shift gears with increasing transmission ratios in succession when shifting up and gears with decreasing transmission ratios in succession when shifting down.

Figure 8:
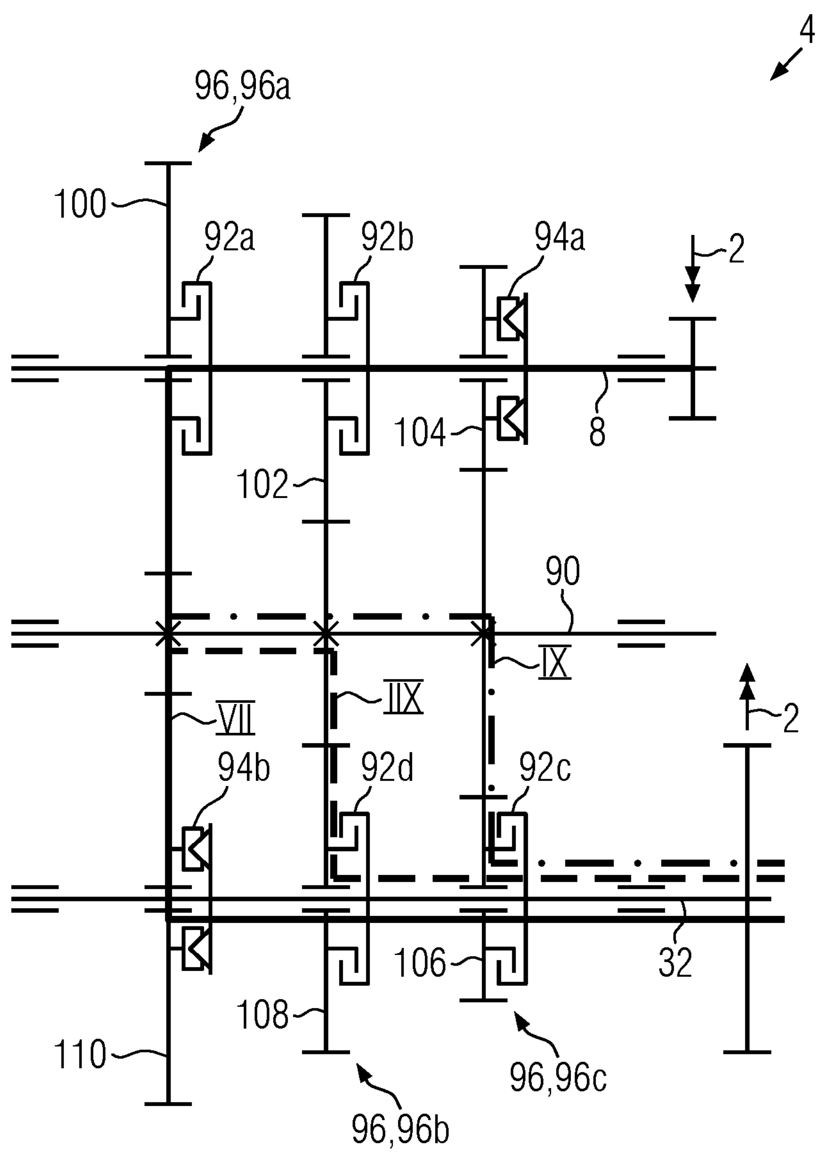
FIG. 8 is a schematic representation of the power flow in the shift gearbox of FIG. 7 at different shift stages.

FIG. 8 shows the power flow 2 of the uppermost three shift stages VII, IIX, IX, which may be shifted when the shifting clutch 92*a* of the largest gear 100 on the input shaft 8 is engaged and the shifting clutch 92*b* of the second largest gear 102 on the input shaft 8 is disengaged. Via the gear shaft 90, the smallest gear 104 on the input shaft 8 is driven at the highest speed so that the freewheel 94*a* spins. Consequently, the power flow is via the gear 100 to the further gear shaft 90.

When the clutch 92*c* is engaged at the smallest gear 106 of the output shaft 42 and the clutch 92*d* is disengaged at the second largest gear 108, the power flow 2 is directed from the gear 100 to the gear 104, corresponding to shift stage IX, which provides the largest ratio into the high speed of the shift gearbox 4. The freewheel 94*b* spins as output shaft 42 rotates faster than the gear 110.

When the shifting clutch 92*c* is disengaged and the shifting clutch 92*d* is engaged, the output shaft 42 still rotates faster than the gear 110 and the freewheel 94*b* spins. The power flow 2 is from the gear 100 to the gear 108, which corresponds to shift stage IIX.

Once the clutches 92*c* and 92*d* are disengaged, the output shaft 42 is driven by the freewheel 94*b*. The power flow 2 is from the gear 100 to the gear 110, corresponding to shift stage VII.

Shift stages IV to VI (not shown) are shifted accordingly when the shifting clutch 92*a* is disengaged and the shifting clutch 92*b* is engaged. The power flow 2 then passes over the gear 102, since the gear 94*a* rotates faster than the input shaft 8 and the freewheel 94 consequently freewheels. Similarly to shift stages VII to IX, in shift stage IV the clutch 94*b* is engaged and the clutch 92*d* is disengaged, in shift stage V the clutch 92*c* is disengaged and the clutch 92*d* is engaged; in shift stage IV the clutches 92*c* and 92*d* are disengaged and the output shaft 42 is entrained by the freewheel 94*b*.

The same applies to shift stages I through III (not shown). The clutches 92*a* and 92*b* are disengaged so that the input shaft drives gear 104 through freewheel 94*a*. In shift stage III, clutch 92*c* is engaged and clutch 92*d* is disengaged; in shift stage II, clutch 92*c* is disengaged and clutch 92*d* is engaged; in shift stage I, clutches 92*c* and 92*d* are disengaged and output shaft 42 is entrained by freewheel 94.

Figure 9:
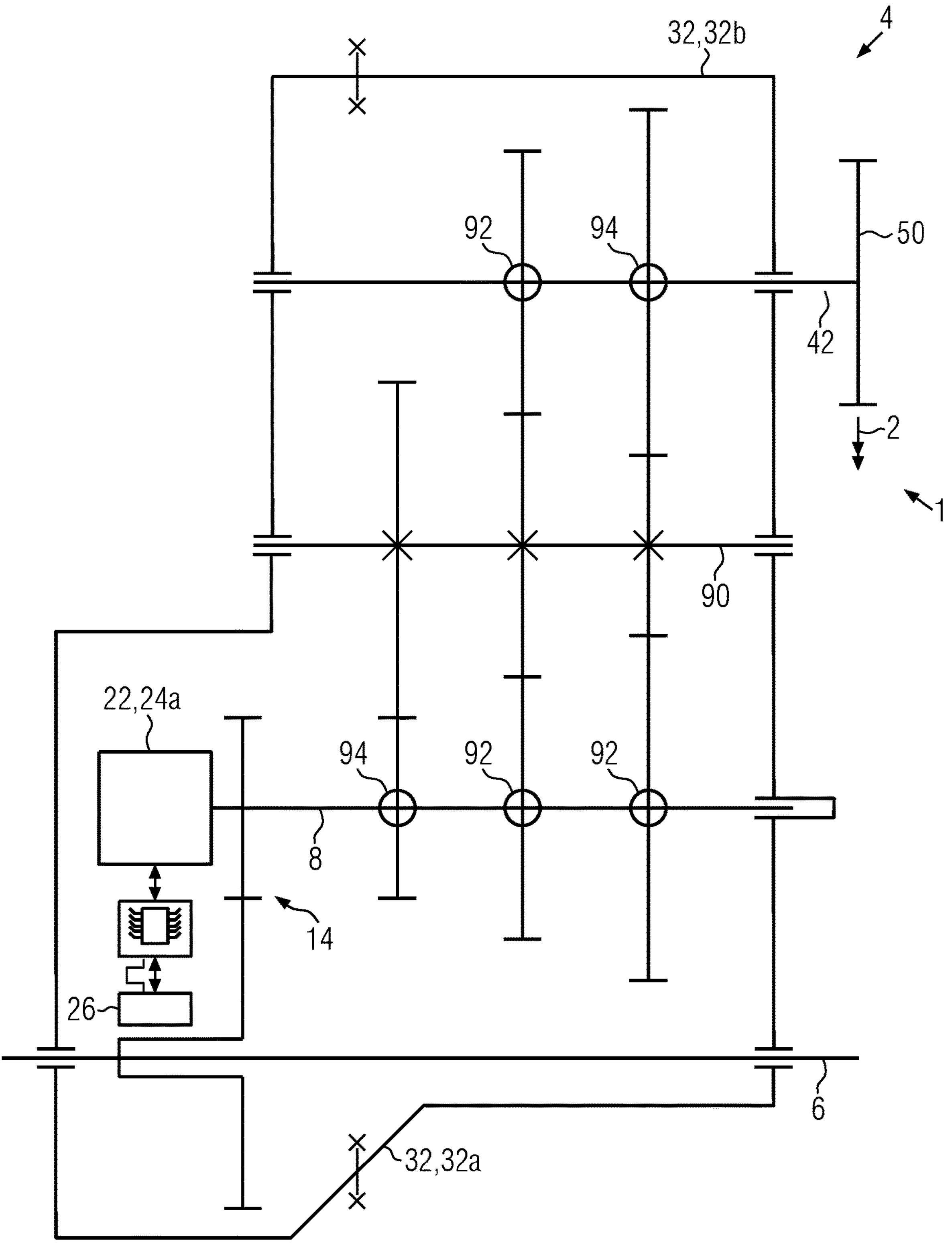
FIG. 9 is a schematic representation of a bottom bracket gearshift of an electric bicycle in a further embodiment.

Another exemplary embodiment of a bottom bracket gearshift 1 is shown in FIG. 9.

The bottom bracket gearshift 1 has a shift gearbox 4 with six gears and an electric auxiliary drive 22. At least three gear shafts 8, 90, 42 are arranged axially parallel to each other and are indirectly or directly mounted in the housing 32. Accordingly, the bottom bracket gearshift 1 has a total of at least four shafts 6, 8, 42, 90. In this case, the output shaft 42 of the shift gearbox may form the output of the bottom bracket gearshift 1 and be configured to hold the drive gear 50. In contrast to the embodiments described above, there is no hollow shaft 44 on the output side; its function is taken over by the output shaft 42. An output stage 36 is not present. The output shaft 42 extends parallel to the bottom bracket shaft 6.

The missing output stage may be compensated for by changing the transmission ratio between the drive gear 50 and the pinion or pulley (not shown) on the rear wheel 84 (FIG. 8). By these measures, the bottom bracket gearshift 1 of FIG. 9 is very light.

The input stage 4 is arranged on the bottom bracket shaft 6. As in the embodiment of FIG. 4, the auxiliary motor 22 drives the input shaft 8 directly, although a freewheel 20*a* (not shown in FIG. 9) may be provided between the shift gearbox 4 and the auxiliary drive 22. A reduction gear 24*b* need not be present.

The housing 32 includes at least two housing parts 32*a*, 32*b* that together enclose the auxiliary drive 22, the shift gearbox 4, the input stage 14 and the bottom bracket shaft.

As in the other embodiments, at least two of the shafts 6, 8, 42, 90 extend out of the housing 32 on at least one side. At least one shaft, here the bottom bracket shaft 6, projects out of the housing 32 on two sides. At least one shaft, here for example the input shaft 8, alternatively another gear shaft 90 or the output shaft 42, is arranged coaxially to the stator and rotor of an electric motor.

At least three gear shafts, for example the input shaft 8, the output shaft 42 and another gear shaft 90, each have at least two gears on them. At least three gears may be connected to at least one of the shafts 8, 90, 42 in a rotationally fixed manner via clutches 92 and/or freewheels 94.

One or more of the shafts 8, 90, 42 may also be configured as a hollow shaft and arranged coaxially with one or more shafts from the group comprising the bottom bracket shaft 6, the input shaft 8, at least one further gear shaft 90 and the output shaft 42. On each of the at least four shafts 6, 8, 90, 42 there is provided at least one gear 100-110.

A speed and/or rotational speed sensor is located on at least one of the shafts 6, 8, 90, 42 or at least one gear

100-110. A torque sensor is located on at least one of the shafts 6, 8, 90, 42 or at least one gear 100-110.

On at least one of the shafts 6, 8, 90, 42, for example the further gear shaft 90, all gears mounted thereon are completely rotationally fixedly connected to this shaft. At least two shafts from the group comprising the input shaft 8, at least one further gear shaft 90 and the output shaft 42 are located in front of the bottom bracket shaft 6 in the direction of travel when the bottom bracket gearshift 1 is installed in the electric bicycle 64.

REFERENCE SIGNS

1 bottom bracket gearshift
2 power train
4 shift gearbox
6 bottom bracket shaft
8 input shaft
10 transmission input
14 input stage
16 drive-side input gear
18 driven-side input gear
20 freewheel
20*a* further freewheel
22 auxiliary drive
24*a* auxiliary motor
24*b* reduction gear
24*c* battery
26 torque and/or speed sensor
28 torque and/or speed signal
30 input hollow shaft
32 bottom bracket gearshift housing
32*a* housing part
32*b* housing part
34 transmission output
36 output stage
38 drive-side output gear
40 driven-side output gear
42 output shaft of shift gearbox
44 output-side hollow shaft
48 input gear
50 traction device
52 axial direction
54 side of housing
56 shift gearbox housing
58 bearing points of the gearbox shafts
60 fastening points of the housing
62 control unit of the auxiliary drive
64 electric bicycle
66 frame
68 down tube
70 top tube
72 seat tube
74 bottom bracket
76 area
78 crank
80 pedal
82 toothed belt
84 rear wheel
86 shifting element
88 handlebar
90 other gear shaft
92, 92*a*, 92*b*, 92*c*, 92*d* shifting clutch
94, 94*a*, 94*b* freewheel of shift gearbox

96, 96*a*, 96*b*, 96*c* shift stage
100, 102, 104,
106, 108, 110 gear of shift gearbox

The invention claimed is:

1. A bottom bracket gearshift for an electric bicycle with an auxiliary drive, comprising:

a bottom bracket shaft, a shift gearbox configured for setting different transmission ratios, and an input stage arranged at a transmission input of the shift gearbox, wherein the input stage is arranged between the shift gearbox and the bottom bracket shaft and is configured as a speed increasing gear for increasing the rotational speed of the bottom bracket shaft, and wherein the shift gearbox has two or more shift stages which are provided with shifting clutches for shifting different gears of the shift gearbox, and wherein the input stage comprises a first input gear on a driven side of the input stage on an input shaft of the shift gearbox and a second input gear on a drive side of the input stage coaxial with the bottom bracket shaft, the bottom bracket gearshift comprises the auxiliary drive, and a power flow from the auxiliary drive and a power flow from the bottom bracket shaft are combined at the input stage or at an output stage.

2. The bottom bracket gearshift according to claim 1, wherein the second input gear on the drive side of the input stage is seated on a hollow shaft on the drive side of the input stage, and the hollow shaft is mounted on the bottom bracket shaft.

3. The bottom bracket gearshift according to either claim 1 or 2, wherein a freewheel is arranged between the input stage and the bottom bracket shaft.

4. The bottom bracket gearshift according to claim 2, wherein the bottom bracket gearshift comprises an output-side hollow shaft, to which a drive gear for a traction device extending to a rear wheel of the electric bicycle is attachable, and wherein the bottom bracket shaft extends coaxially in the output-side hollow shaft.

5. The bottom bracket gearshift according to claim 4, wherein at a transmission output of the shift gearbox an output stage comprises a driven-side output gear coaxial with the bottom bracket shaft and an output gear on the drive side on an output shaft of the shift gearbox.

6. The bottom bracket gearshift according to claim 5, wherein the driven-side output gear drives the output-side hollow shaft.

7. The bottom bracket gearshift according to claim 6, wherein the hollow shaft on the drive side and the output-side hollow shaft are arranged side by side on the bottom bracket shaft.

8. The bottom bracket gearshift according to claim 6, comprising a housing that accommodates the shift gearbox and the bottom bracket shaft and that is configured to accommodate the auxiliary drive.

9. The bottom bracket gearshift according to claim 5, wherein the output stage is configured as a reduction gear.

10. The bottom bracket gearshift according to claim 9, wherein the hollow shaft on the drive side and the output-side hollow shaft are arranged side by side on the bottom bracket shaft.

11. The bottom bracket gearshift according to claim 5, wherein the auxiliary drive is structurally integrated into the bottom bracket gearshift.

12. The bottom bracket gearshift according to claim 4, wherein the hollow shaft on the drive side and the output-side hollow shaft are arranged side by side on the bottom bracket shaft.

13. The bottom bracket gearshift according to claim 1, comprising a housing that accommodates the shift gearbox and the bottom bracket shaft and that is configured to accommodate the auxiliary drive.

14. An electric bicycle with the bottom bracket gearshift according to claim 1, the bottom bracket gearshift being provided in an area of a bottom bracket of the electric bicycle.

15. The bottom bracket gearshift according to claim 1, wherein the bottom bracket gearshift comprises an output-side hollow shaft, to which a drive gear for a traction device extending to a rear wheel of the electric bicycle is attachable, and wherein the bottom bracket shaft extends coaxially in the output-side hollow shaft.

16. A bottom bracket gearshift for an electric bicycle with an auxiliary drive, comprising:

a bottom bracket shaft, a shift gearbox configured for setting different transmission ratios, and an input stage arranged at a transmission input of the shift gearbox; and a housing that accommodates the shift gearbox and the bottom bracket shaft and that is configured to accommodate the auxiliary drive, wherein the input stage is arranged between the shift gearbox and the bottom bracket shaft and is configured as a speed increasing gear for increasing the rotational speed of the bottom bracket shaft, and wherein the shift gearbox has two or more shift stages which are provided with shifting clutches for shifting different gears of the shift gearbox.

17. The bottom bracket gearshift according to claim 16, wherein at a transmission output of the shift gearbox an output stage comprises a driven-side output gear coaxial with the bottom bracket shaft and an output gear on a drive side on an output shaft of the shift gearbox.

18. A bottom bracket gearshift for an electric bicycle with an auxiliary drive, comprising:

a bottom bracket shaft, a shift gearbox configured for setting different transmission ratios, and an input stage arranged at a transmission input of the shift gearbox, wherein the input stage is arranged between the shift gearbox and the bottom bracket shaft and is configured as a speed increasing gear for increasing the rotational speed of the bottom bracket shaft, and wherein the shift gearbox has two or more shift stages which are provided with shifting clutches for shifting different gears of the shift gearbox, and wherein at a transmission output of the shift gearbox an output stage comprises a driven-side output gear coaxial with the bottom bracket shaft and an output gear on a drive side on an output shaft of the shift gearbox.

19. The bottom bracket gearshift according to claim 18, wherein the input stage comprises a first input gear on a driven side of the input stage on an input shaft of the shift gearbox and a second input gear on a drive side of the input stage coaxial with the bottom bracket shaft.

* * * * *